(12) United States Patent
Diehl

(10) Patent No.: US 7,596,261 B2
(45) Date of Patent: Sep. 29, 2009

(54) METHOD AND SYSTEM FOR THE METROLOGICAL DETECTION OF DIFFERENCES IN THE VISUALLY PERCEIVED COLOR IMPRESSION BETWEEN A MULTICOLORED PATTERNED SURFACE OF A REFERENCE AND A MULTICOLORED PATTERNED SURFACE OF A SPECIMEN

(75) Inventor: Hans-Peter Diehl, Constance (DE)

(73) Assignee: Massen Machine Vision Systems GmbH, Constance (DE)

( * ) Notice: Subject to any disclaimer, the term of this patent is extended or adjusted under 35 U.S.C. 154(b) by 613 days.

(21) Appl. No.: 10/562,390

(22) PCT Filed: Jun. 21, 2004

(86) PCT No.: PCT/EP2004/006695

§ 371 (c)(1),
(2), (4) Date: Apr. 7, 2006

(87) PCT Pub. No.: WO2004/113855

PCT Pub. Date: Dec. 29, 2004

(65) Prior Publication Data

US 2006/0233437 A1    Oct. 19, 2006

(30) Foreign Application Priority Data

Jun. 24, 2003    (DE)    ............... 103 28 322

(51) Int. Cl.
G06K 9/00    (2006.01)

(52) U.S. Cl. .................................................. 382/162
(58) Field of Classification Search ................ 382/100, 382/108, 112, 141, 149, 162, 168, 218–222, 382/228; 358/406, 504; 356/445–446; 348/86, 348/92, 125, 128
See application file for complete search history.

(56) References Cited

U.S. PATENT DOCUMENTS

| | | | |
|---|---|---|---|
| 5,155,558 A | 10/1992 | Tannenbaum et al. | |
| 5,809,165 A | 9/1998 | Massen | |
| 6,035,065 A | 3/2000 | Kobayashi et al. | |
| 6,483,938 B1 | 11/2002 | Hennessey et al. | |

FOREIGN PATENT DOCUMENTS

WO    WO 03/031956    4/2003

Primary Examiner—Jose L Couso
(74) Attorney, Agent, or Firm—Stuart J. Friedman

(57) ABSTRACT

There is described a method and an arrangement for the metrological detection of the differences in the visually perceived color impression between a multi-color patterned surface (10) of a reference and a multi-color patterned surface (12) of a test item. Concomitantly changes in the color statistics and in other color variation rates of the test item compared to a reference, and changes in the picture definition of the pattern of the test item compared to the reference, are determined by means of spatial sensors (24) provided with color capability, such as color picture cameras and displayed. According to the invention, a common variation rate for the visually perceived color variation of multi-color patterned surfaces with references is established by a combination of the two variations.

14 Claims, 2 Drawing Sheets

Figure 1:
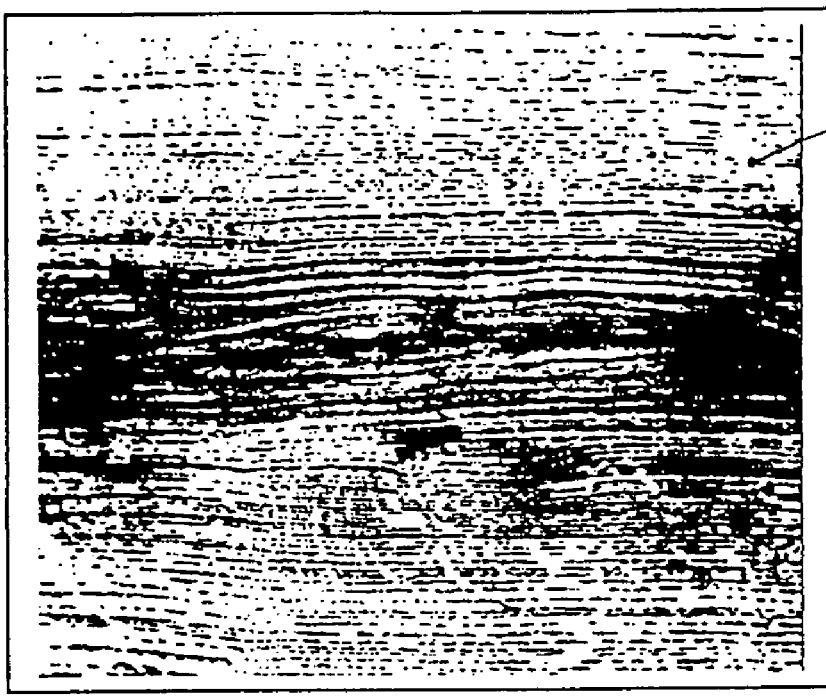

METHOD AND SYSTEM FOR THE METROLOGICAL DETECTION OF DIFFERENCES IN THE VISUALLY PERCEIVED COLOR IMPRESSION BETWEEN A MULTICOLORED PATTERNED SURFACE OF A REFERENCE AND A MULTICOLORED PATTERNED SURFACE OF A SPECIMEN

The present invention relates to a method of metrologically detecting the differences in the visually perceived color impression between a multi-color patterned surface of a reference and a multi-color patterned surface of a test item, wherein a spatial sensor which detects the surface to be evaluated captures signals, and in which by means of the captured signals is determined at least one of the following features which describe the color characteristics of the multi-color patterned surface:

- a statistical description of the characteristics of the various colors applied,
- the geometric distribution of the various colors applied on the surface,
- shape-related features of single-colored elements all pertaining to one respective color of the multi-colored pattern,
- shape-related features of visually distinguishable elements of the multi-colored pattern.

The statistical description is effected with radiometric means by color histograms generated in a suitably selected color space and/or by the variables derived therefrom, such as mean values, variances and similar descriptions which are known to a person skilled in the field of color textures.

The present invention further relates to an arrangement for the metrological detection of the differences in the visually perceived color impression between a multi-color patterned surface of a reference and a multi-color patterned surface of a test item, comprising a light source with an essentially constant intensity and spectral distribution for illuminating the multi-color patterned surface of the test item, a spatial sensor for detecting the illuminated surface, an arithmetic unit in which metrological values are determined from the signals of the spatial sensor, which values describe the color characteristics of the multi-color patterned surface.

Monitoring the color impression of multi-color patterned products such as, for instance, laminate-based floor decors, ceramic tiles or color patterned panels manufactured by printing, in the production line is to date a largely unsolved problem in terms of measurement technology, and is performed by a purely visual inspection in a laborious, inaccurate and labor-intensive manner at high costs. The essential reason for this lies in the fact that the classical colorimetry is principally limited to single-colored surfaces, in fact irrespective of whether spectrometers or multicolor filter sensors are being used. This classical measurement technology only detects averaged color values, namely averaged across the optical aperture of the sensor or spectrometer. Thus, it is not suitable for measuring multi-color patterned surfaces.

From EP 0 692 089 B1 it is known to detect, by means of image rendering sensors, color pictures of the multi-color patterned product surfaces which are to be monitored, and to identify variations in the multicolor design by comparing the color histograms of a reference with the color histograms of the test item.

The color impression of the human visual system, however, is not only determined by the physically measurable various colors and their frequencies of occurrence. So it is known, for instance in the sophisticated printing of multi-colored laminate-based decors—which in many cases imitate complicated natural surfaces such as wood or natural stone—that instabilities in the production process result in visible color shifts which are metrologically not verifiable as color differences or differences in the color statistic. Studies have shown that variations in the picture definition of multi-color patterned surfaces are often perceived by the human visual system as a color shift such as a red tint, such tint then being object of complaint. The actual physical alteration compared with the reference, namely the different picture definition due to registration problems or problems with the distortion of the printed draft in the respective printing units, is not identified by the human eye as such.

The picture definition can be metrologically determined by means of various methods such as, for instance:

a) By means of the bandwidth of the spatial frequencies contained in the picture. The higher the picture definition is, the higher the spatial frequencies will be, which occur in the spatial frequency spectrum.

b) By means of the gradients of the intensity picture. The higher the picture definition is, the steeper the transitions from light to dark in the spatial picture will be.

These and other methods are known to a person skilled in the field of optics and image processing.

The classical, average-forming colorimetry is basically not able to measure the picture definition, as it only registers or captures the spatial frequency "zero", i.e. the structureless mean value.

The comparison between color histograms which are obtained from color camera pictures, which is described in the above mentioned patent EP 0 692 089 B1, is likewise independent of the spatial frequencies contained in the color pictures and thus does not provide any information about the picture definition.

The production of drafts with an imperfect, visually perceived color drift implies high economical losses, in particular in case these normally very small variations will be noticeable only after laying at the customer's and then entail expensive taking back actions.

The current start-up procedure of these printing processes is difficult and lengthy, too, because sampling has to be done again and again in order to visually check the stability respectively the matching with a reference.

Thus, there is high economical and technical interest in a measurement method which is capable of measuring and monitoring the visually perceivable color impression of multi-color patterned drafts in or near production, in fact irrespective of whether the physical reasons are due to a change in the colors and their statistics or due to a change in the definition of the multi-color patterned print image.

This is achieved according to the invention in that parallel to the determination of the features describing the color characteristics by means of the captured signals, the picture definition is determined, that the values for the features of the test item which describe the color characteristics are compared with the corresponding predefined values of the reference, and the values of the test item which describe the picture definition are compared with the corresponding predefined values of the reference, and that these variations are displayed as separate variation rates for the metrological evaluation of the visually distinguishable differences in the color impression.

As the variation rate between the test item and the reference is evaluated and displayed both with regard to the features describing the color characteristics and the picture definition, it appears whether possible differences in the visual color impression are due to an unequal picture definition or varying physical color characteristics. Thus it is possible to immediately take appropriate measures to adapt the visually perceived color impression of the test items to that of the reference.

According to a preferred variant the variation rates are combined to and displayed as a common variation rate which corresponds to the visual color impression alternatively or in addition to the separate displaying of the variation rates. The combination of the measurements detecting the color characteristics with the measurements of the picture definition is preferably effected by a parameterizable mathematical function, preferably by a polynomial, the parameters of which have been experimentally determined.

According to a preferred variant the picture definition is determined from the intensity of the signals. As the patterned surface is detected in a spatial manner, it is possible to determine the light-dark transitions in the spatial picture with the aid of the intensity signals. The higher the picture definition is, the steeper these transitions will be.

The present invention provides further an arrangement for measuring and monitoring the visually perceivable color impression of multi-color patterned drafts in or near production, in fact irrespective of whether the physical reasons are due to a change in the colors and their statistics or due to a change in the definition of the multi-color patterned print image.

This is achieved according to the invention in that from the signals of the spatial sensor values are further determined which describe the picture definition of the multi-color patterned surface, and that one display unit is provided for displaying variation rates which are generated by a comparison of the values of the test item which describe the color characteristics with the corresponding predefined values of the reference, as well as for displaying variation rates which are generated by a comparison of the values of the test item which describe the picture definition with the corresponding predefined values of the reference.

Further features and advantageous designs will be apparent from the subordinate claims.

The method and the arrangement shall be made clear in the following on the concrete example of monitoring the sophisticated printing of multi-color patterned decor foils for floor laminates, furniture laminates or wall panels, for example. This example is not to be understood in a limiting sense, but rather can be applied to all multi-color patterned surfaces in which instabilities of the production process may give rise to physical color variations as well as to variations in the definition of the generated pattern. This happens regularly in all printing processes, but may also arise during the manufacturing of multi-color patterned surfaces by interspersing multi-colored particles in a homogeneous plastic material.

Figure 2:
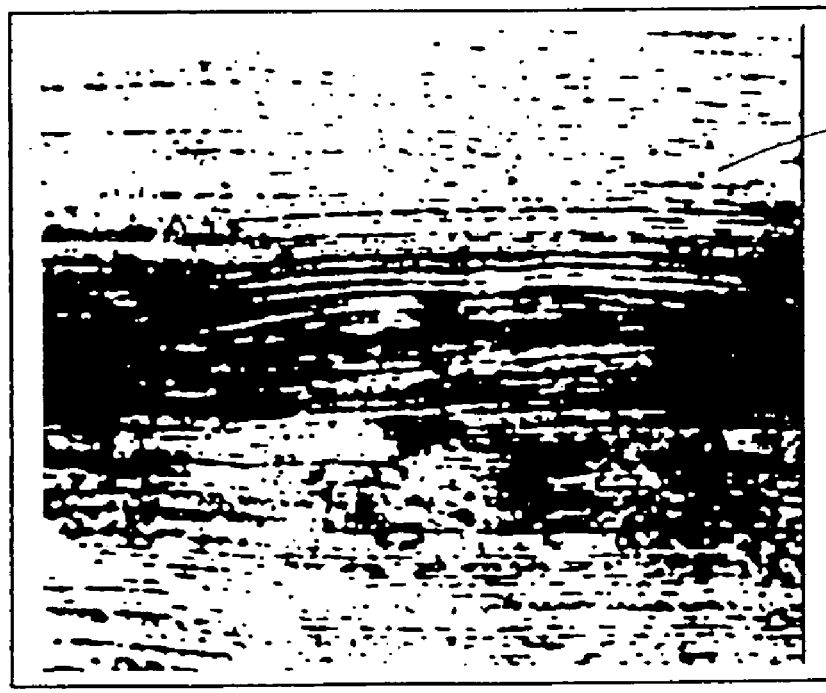
Figure 3:
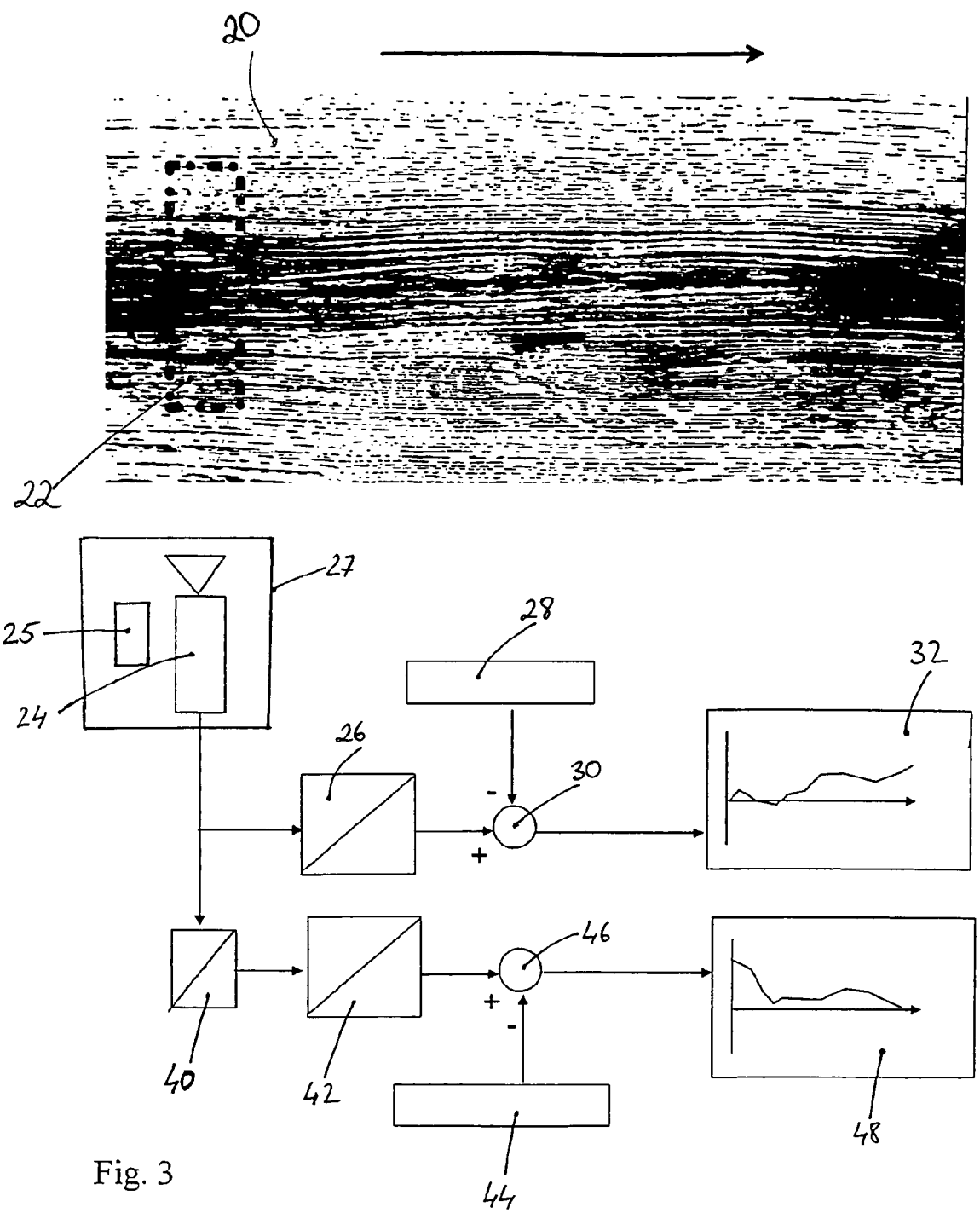

The idea of the invention will be explained by means of FIG. 1 to 3. In the drawings:

FIG. 1 schematically shows in a black and white presentation the pattern of a multi-colored decor foil for floor laminates which imitates a wooden surface, FIG. 2 schematically shows in a black and white presentation a diminishment of the picture definition of the pattern of FIG. 1 in a strongly overdrawn presentation, for instance caused by an imperfect registration of the individual printing stages and/or by local distortions of the printed paper in the printing stage, FIG. 3 exemplarily shows how a cut-out of the decor foil is detected in a spatial manner by a color camera and a color statistic is obtained from the picture signals of the camera, which is concomitantly compared with a reference, and how the variation rate is displayed, and also shows how a measure for the local picture definition is obtained from the reconstructed intensity picture, which is compared with a reference and how the variation rate is displayed, which describes the difference in the picture definition.

The typographic manufacturing of a laminate decor imitating a natural, multi-colored wooden surface, is a sophisticated multicolor process in which already slight production drifts result in a color shift which is noticeable to the human visual system. FIG. 1 shows in a black and white presentation a typical multi-colored wood grain with both a correct color rendering and a correct picture definition. The surface 10 with such wood grain corresponds to the multi-color patterned surface of a reference according to the present invention. In comparison to this, FIG. 2 shows (again in a black and white presentation) the wood grain of FIG. 1 with unchanged colors, but with a poor picture definition which (here for reasons of clearness) is extremely overdrawn. The surface 12 having such grain pertains to a test item. Altered picture definitions will develop in multicolor printing in particular on account of two influencing factors:

a) through the registration (alignment) of the individual impression cylinders;

b) by expansion and distortion of the foil to be printed in the printing units.

It is a peculiarity of the human color perception that with multi-color patterned surfaces variations in the picture definition are not perceived as those, but rather appear as a color shift (e.g. as a grain which is slightly more reddish). Hence, during product acceptance there will be made a complaint about a defect in colors, although the actual reason is not due to the color application, color composition or color constancy of the pigments, but lies entirely elsewhere, in fact in the altered registration of the printing units or the differing distortions of the printed foil.

It is therefore extremely important to metrologically detect within production the real physical cause.

By means of a preferred example, FIG. 3 makes clear the individual method steps according to the present invention and components of the arrangement according to the invention. The decor paper 20, moved from left to right in the direction of the arrow and printed in multi-colors with a wood-like pattern, is scanned in a section 22 with an image rendering sensor 24 provided with color capability, such as a line camera with color capability (an arrangement of several neighboring, discrete color sensors). The printed decor paper 20 is illuminated by a light source 25 with an essentially constant intensity and spectral distribution. In an arithmetic unit 26 and with methods known from picture processing, statistical descriptions of the multicolor design, for instance color histograms, are continuously calculated from the captured color signals the color histograms being compared in a comparing unit 30 with reference histograms stored in a unit 28. The variation rates which are generated by the comparison of the color histograms of reference and test item are displayed on a display 32.

According to a preferred arrangement, the light source 25 and the image rendering color sensor 24 are combined in a measuring head 27. It is preferred that the measuring head 27 has calibration means for the automatic recalibration thereof. With flat, moved products in form of a web, the measuring head 27 preferably is positioned to be so close to the surface that no stray light arrives at the illuminated surface, which light comes from the environment and would adulterate the measurement.

The signals from the image rendering sensor 24 may, for instance, be transformed to the IHS color space (I="intensity", H="hue", S="saturation"). The color control may be effected by a presentation of the various color vectors as a scatter plot in the three-dimensional IHS space. The frequency of occurrence of the individual color vectors may be taken into consideration as a further parameter. In addition to this or alternatively, it is possible to derive variables such as mean values and variances from the parameters, for the statistical description of the characteristics of the applied colors.

In place of or in addition to a statistical description of the characteristics of the applied various colors, it is also possible to determine by means of the captured signals the geometric distribution of the various color patterns applied on the surface, for instance by local concentration measures. One possible parameter for describing the geometric distribution is the local orientation of the color patterns, or also other similar geometric texture characteristics known to a person skilled in the art. It is also possible to determine shape-related features of the single-colored elements, all pertaining to one respective color of the multi-colored pattern, and/or shape-related features of visually distinguishable elements of the multi-colored pattern.

Parallel to this, a conversion unit 40 converts the color signals to intensity signals from which a second arithmetic unit 42—with methods known from optics and image processing—continuously determines a measure for the definition of the print image, which is compared in a second comparing unit 46 with the reference values stored in a second unit 44. The variation rates established by a comparison of the values of reference and test item are displayed by means of a second display 48.

By a parallel presentation of the variation in the multicolor design and of the change in the picture definition, it is possible to identify changes and the reasons thereof immediately during production.

It is also possible to provide several spatial sensors which detect the entire surface or only a cut-out of the surfaces to be evaluated.

Instead of determining the picture definition by means of the intensity of the signals, this can also be achieved using the saturation of the signals. The signals of the image rendering sensor 24 will then be present as saturation signals or are converted to these in the conversion unit 40, from which signals the arithmetic unit 42—with methods known from optics and image processing—continuously determines a measure for the definition of the print image and subsequently compares it with the stored reference values.

It is due to the metrological display of both variations that the setup procedure can be accelerated and objectivated. At present, a new print job of continuous decor webs is set up such that stops are made again and again, samples are cut out and visually compared with a reference, and the numerous influencing parameters are iteratively adjusted until a matching adjustment is finally achieved. This procedure is lengthy and expensive and is highly dependent on the skills of the respective person. The final release for printing is still poorly documented and risky.

It is preferred that, alternatively or in addition to the separate displaying 32 and 48 of the variation rates, the color variation rate and the picture definition variation rate are combined such that a resultant variation rate is generated which conforms to the visual perception of the color variation as good as possible. The color variation rate and the picture definition variation rate are combined by a mathematical function, preferably by a parameterizable mathematical function, especially by a polynomial, the parameters of which have been experimentally determined.

According to a further preferred variant the measured variation rates are compared with tolerance thresholds. In this way it is possible by a simple threshold operation to automatically preclude those vectors which occur too rarely and thus can be seen as flaws. It is also possible by means of the tolerance thresholds to identify outliers along the hue axis and preclude them from color control, which outliers are for instance due to the protruding of a zone having a different color, like a marking or a label, and not pertaining to the pattern.

The monitoring of the multi-color patterned printing of laminate decor papers which has been described so far is to be understood as an example. Basically it applies to all multi-color patterned surfaces that a change in the visually perceived color impression also depends on the definition of the multi-color patterned print. The idea of the invention can thus be applied to all multi-color patterned surfaces in which the visual impression has to range within a small tolerance, irrespective of whether they are manufactured by printing or by means of other methods, and irrespective of the materials of which they are made. It may also be applied to the evaluation and comparison of such surfaces which are not produced by engineering, but have a natural origin, such as for instance natural stones, marmoreal materials, natural lumbers, because here again the visual color impression is influenced by the statistics of the multicolor design and the definition of the pattern.

Apart from measuring the picture definition, the invention is not limited to merely measure the color histograms for the physical evaluation of the color variation. It is known to the person skilled in the field of color image processing that also further variables such as e.g. the local distribution of the pattern portions which pertain to one and the same color, and the shape-related features of the pattern shapes which pertain to one and the same color, as well as the statistics thereof have influence on the visual color perception. An essential idea of the invention is that among other things the picture definition is measured, which in the proper sense is a rather geometrical characteristic of the picture and physically does not depend on these color characteristics, because it will not be perceived by the visual system of a human observer as a geometrical characteristic, but as a color characteristic.

The invention claimed is:

1. A method of metrologically detecting differences in a visually perceived color impression between a multi-color patterned surface of a reference surface and a multi-color patterned surface of an item under test, comprising the steps of:
   detecting a surface of the item under test and obtaining captured signals from the detected surface, said captured signals comprising signals produced by an image rendering sensor provided with color capability which scans at least a section of the item under test;
   obtaining a description of color characteristics of the multi-color patterned surface from the captured signals;
   concomitantly obtaining from the captured signals a description of picture definition of the multi-color patterned surface;
   obtaining a color characteristics variation rate by comparing the description of color characteristics with stored corresponding values of the reference surface;
   obtaining a picture definition variation rate by comparing the description of picture definition with corresponding stored values of the reference surface; and
   evaluating the visually perceived differences in color impression from the color characteristics variation-rate and the picture definition variation rate.

2. The method according to claim 1, wherein the color characteristics is one of the following:

a statistical description of the characteristics of the various colors applied, the geometric distribution of the various colors applied on the surface, shape-related features of single-colored elements all pertaining to one respective color of the multi-colored pattern, shape-related features of visually distinguishable elements of the multi-colored pattern.

3. The method according to claim 1, wherein the color characteristics variation rate and the picture definition variation rate are separately displayed or are combined and displayed as a common variation rate which corresponds to the visually perceived color impression.

4. The method according to claim 3, wherein the combination is effected by a parameterizable mathematical function, preferably by a polynomial, the parameters of which have been experimentally determined.

5. The method according to claim 1, wherein the variation rates are compared with stored tolerance thresholds.

6. The method according to claim 1, wherein the picture definition is determined from the intensity of the captured signals.

7. The method according to claim 1, wherein the picture definition is determined from the saturation of the captured signals.

8. An arrangement for the metrological detection of differences in a visually perceived color impression between a multi-color patterned reference surface and a multi-color patterned surface of an item under test, comprising:

a light source with an essentially constant intensity and spectral distribution for illuminating the multi-color patterned surface of the item under test;

a spatial sensor for detecting the illuminated surface of the item under test;

an arithmetic unit, comprising software on a computer-readable medium, in which metrological values are determined from captured signals provided by the spatial sensor to describe color characteristics of the multi-color patterned surface of the item under test;

deriving means, comprising software on a computer-readable medium, for deriving from the captured signals a description of picture definition of the multi-color patterned surface of the item under test; and display means for displaying a color characteristics variation rate obtained by comparison of the item under test with corresponding stored values of the reference surface, and a picture definition variation rate obtained by comparison of the item under test with corresponding stored values of the reference surface.

9. The arrangement according to claim 8, wherein a conversion unit is provided which converts signals from the spatial sensor into intensity signals.

10. The arrangement according to claim 8, wherein a conversion unit is provided which converts signals from the spatial sensor into saturation signals.

11. The arrangement according to claim 8, wherein the spatial sensor is an image rendering color sensor.

12. The arrangement according to claim 8, wherein the light source and the spatial sensor are combined in a measuring head.

13. The arrangement according to claim 12, wherein the measuring head has calibration means for its automatic recalibration.

14. The arrangement according to claim 12, wherein for detecting flat, moved products in form of a web, the measuring head is positioned sufficiently close to the detected surface of the web to prevent environmental light from significantly contributing to the captured signals.

* * * * *